United States Patent
Kalayciyan et al.

(10) Patent No.: US 12,032,103 B2
(45) Date of Patent: Jul. 9, 2024

(54) MEASUREMENT BY MEANS OF AN ULTRASONIC SENSOR SYSTEM IN AN INTERFERING ENVIRONMENT

(71) Applicant: Valeo Schalter und Sensoren GmbH, Bietigheim-Bissingen (DE)

(72) Inventors: Raffi Kalayciyan, Bietigheim-Bissingen (DE); Jean Francois Bariant, Bietigheim-Bissingen (DE); Anto Joys Yesuadimai Michael, Bietigheim-Bissingen (DE); Mohamed Elamir Mohamed, Bietigheim-Bissingen (DE); Michael Kunz, Bietigheim-Bissingen (DE); Thomas Illing, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 77 days.

(21) Appl. No.: 17/782,878

(22) PCT Filed: Dec. 2, 2020

(86) PCT No.: PCT/EP2020/084205
§ 371 (c)(1),
(2) Date: Jun. 6, 2022

(87) PCT Pub. No.: WO2021/110715
PCT Pub. Date: Jun. 10, 2021

(65) Prior Publication Data
US 2023/0016677 A1    Jan. 19, 2023

(30) Foreign Application Priority Data
Dec. 6, 2019 (DE) ...................... 10 2019 133 426.8

(51) Int. Cl.
*G01S 7/52* (2006.01)
*G01S 15/931* (2020.01)

(52) U.S. Cl.
CPC ...... *G01S 7/52015* (2013.01); *G01S 7/52004* (2013.01); *G01S 15/931* (2013.01)

(58) Field of Classification Search
CPC . G01S 7/52015; G01S 7/52004; G01S 15/931
See application file for complete search history.

(56) References Cited

U.S. PATENT DOCUMENTS

| 2017/0176594 A1* | 6/2017 | Ichikawa | ............... G08G 1/166 |
| 2023/0016677 A1* | 1/2023 | Kalayciyan | ......... G01S 7/52004 |

FOREIGN PATENT DOCUMENTS

| CN | 1959404 A | * | 5/2007 |
| CN | 105158740 A | | 12/2015 |

(Continued)

OTHER PUBLICATIONS

Translation of CN107884774, Pub.: Sep. 28, 2021 Filed: Dec. 1, 2017 (Year: 2021).*

(Continued)

*Primary Examiner* — Daniel Pihulic
(74) *Attorney, Agent, or Firm* — Osha Bergman Watanabe & Burton LLP

(57) ABSTRACT

The present invention relates to a method for measurement by means of an ultrasonic sensor system in an interfering environment, for example in a magnetic field, for a vehicle, the method comprising the following method steps: emitting, by means of an ultrasonic sensor system, ultrasound with at least one frequency range (100); receiving, by means of an ultrasonic sensor system, an echo (200) produced by the ultrasound; outputting, by means of an ultrasonic sensor system, a signal corresponding to the echo to a control system (300); detecting, by means of a detection system, (Continued)

noise of the signal (400); determining, by means of the control system, whether there is interference in the at least one frequency range, on the basis of the noise of the signal (500); and, if interference is determined, emitting, by means of the ultrasonic sensor system, ultrasound with at least one frequency range (600) for which no interference is determined. The present invention also relates to a device for measurement by means of an ultrasonic sensor system in a magnetic field, for a vehicle, to a vehicle having the device, to a computer program, to a data carrier signal, which transmits the computer program, and to a computer-readable medium.

11 Claims, 2 Drawing Sheets

(56) References Cited

FOREIGN PATENT DOCUMENTS

| | | | | | |
|---|---|---|---|---|---|
| CN | 105203839 | A | | 12/2015 | |
| CN | 107884774 | A | | 4/2018 | |
| CN | 109800634 | A | | 5/2019 | |
| CN | 107884774 | B | * | 9/2021 | ............. G01S 15/08 |
| CN | 114930190 | A | * | 8/2022 | ........... G01S 15/931 |
| CN | 116806318 | A | * | 9/2023 | |
| DE | 3806847 | A1 | | 9/1989 | |
| DE | 102010020023 | A1 | * | 11/2011 | ............. G01S 15/04 |
| DE | 102010033383 | A1 | * | 2/2012 | ........... G01S 15/104 |
| DE | 102010033384 | A1 | * | 2/2012 | ........... G01S 15/105 |
| DE | 102017216825 | A1 | | 3/2019 | |
| DE | 102019133426 | A1 | * | 6/2021 | ........... G01S 15/931 |
| DE | 102022107066 | A1 | * | 9/2023 | |
| EP | 2601539 | A1 | * | 6/2013 | ........... G01S 15/105 |
| EP | 4070127 | A1 | * | 10/2022 | ........... G01S 15/931 |
| JP | 2009-250672 | A | | 10/2009 | |
| WO | WO-2011141312 | A1 | * | 11/2011 | ............. G01S 15/04 |
| WO | WO-2012016834 | A1 | * | 2/2012 | ........... G01S 15/105 |
| WO | WO-2012016841 | A1 | * | 2/2012 | ........... G01S 15/104 |
| WO | 2016042697 | A1 | | 3/2016 | |
| WO | 2019/057864 | A1 | | 3/2019 | |
| WO | WO-2021110715 | A1 | * | 6/2021 | ........... G01S 15/931 |
| WO | WO-2023180133 | A1 | * | 9/2023 | |

OTHER PUBLICATIONS

Office Action issued in corresponding JP application No. 2022-533495, dated May 23, 2023. (8 Pages with English Translation).
International Search Report and Written Opinion in corresponding International Application No. PCT/EP2020/084205, dated Mar. 10, 2021 (14 pages).
Office Action issued in Corresponding CN Application No. 202080092271.8, dated Apr. 15, 2024. (22 Pages with English Translation).

* cited by examiner

MEASUREMENT BY MEANS OF AN ULTRASONIC SENSOR SYSTEM IN AN INTERFERING ENVIRONMENT

The present invention relates to a method for measurement by means of an ultrasonic sensor system in an interfering environment for a vehicle.

The present invention also relates to a device for measurement by means of an ultrasonic sensor system in an interfering environment for a vehicle.

Furthermore, the present invention relates to a vehicle having the device.

The present invention furthermore relates to a computer program comprising commands that, when the computer program is executed by a computer, cause the latter to carry out steps of the method.

The present invention furthermore relates to a data carrier signal that transmits the computer program.

The present invention furthermore relates to a computer-readable medium comprising commands that, when executed by a computer, cause the latter to carry out steps of the method.

The more automated driving develops and the higher the number of sensors in the car, the higher the probability of crosstalk between the sensors. In particular vehicle antennas for short-range communication such as keyless entry in the kilohertz range may interfere with the ultrasonic parking assistance sensors if they are close together. Furthermore, vehicle standards around the world are becoming more and more stringent in regard to immunity testing. External magnetic noise arises e.g. at traffic lights or gates, when parking next to an inductively charging, parked vehicle.

It is known practise to use an ultrasonic sensor having a shielding plate for measurements in an interfering environment, for example under the influence of electric fields or magnetic fields. The plate works well for electrical interference, but not for the ultrasonic frequencies in the order of kilohertz, e.g. 40-60 kHz. Magnetic shielding would have to be made from a magnetizable material, which would typically be significantly more expensive.

Proceeding from the prior art mentioned above, the invention is therefore based on the object of specifying an improved method, an improved device, an improved vehicle, an improved computer program, an improved data carrier signal and an improved computer-readable medium.

In particular significantly and at the same time cost-effectively improving reliable detection in a frequency range in the order of kilohertz.

The object is achieved according to the invention by the features of the independent claims. Advantageous configurations of the invention are specified in the subclaims.

According to the invention, a method for measurement by means of an ultrasonic sensor system in an interfering environment is thus specified. The method is intended for a vehicle. The method comprises the following method steps: emitting, by means of an ultrasonic sensor system, ultrasound having at least one frequency range; receiving, by means of the ultrasonic sensor system, an echo produced by the ultrasound; outputting, by means of the ultrasonic sensor system, a signal corresponding to the echo to a control system; detecting, by means of a detection system, noise in the signal; determining, by means of the control system, whether there is interference in the at least one frequency range on the basis of the noise in the signal; and if the interference is determined, emitting, by means of the ultrasonic sensor system, ultrasound having at least one frequency range for which no interference is determined.

Preferably, the last step of the method according to the invention is performed in the vehicle.

The order of the method steps may be varied as desired, provided this is technically useful. The order of the method steps that is described above is preferred, i.e. after a step of emitting, by means of an ultrasonic sensor system, ultrasound having at least one frequency range, an echo produced by the ultrasound is received by means of the ultrasonic sensor system.

After the step of receiving the echo, a signal corresponding to the echo is output to a control system by means of the ultrasonic sensor system.

After the step of outputting a signal, noise in the signal is detected by means of a detection system.

After the step of detecting the noise in the signal, the control system is used to determine whether there is interference in the at least one frequency range on the basis of the noise in the signal.

After the step of determining whether there is interference, if the interference is determined, ultrasound having at least one frequency range for which no interference is determined is emitted by means of the ultrasonic sensor system.

Interference may be noise within an integrated circuit of the ultrasonic sensor system or a component interacting with the ultrasonic sensor system. The noise covers the measurement signal, for example. Alternatively or additionally, noise may also have been caused directly by one (multiple) sensors that are under the influence of an interfering environment, for example a magnetic field. There may also be interference that, although measurable, does not affect the measuring ability of the sensor in the frequency range.

According to the invention, a device for measurement by means of an ultrasonic sensor system in an interfering environment is also specified. The device is suitable for a vehicle. The device comprises: an ultrasonic sensor system configured to emit ultrasound having at least one frequency range, to receive an echo produced by the ultrasound, and to output a signal corresponding to the echo to a control system; a detection system configured to detect noise in the signal; the control system configured to determine whether there is interference in the at least one frequency range on the basis of the noise in the signal; and the ultrasonic sensor system is designed so as, if the interference is determined, to emit ultrasound having at least one frequency range for which no interference is determined.

The device preferably has means corresponding to one of the method steps described below according to one of the advantageous embodiments.

Furthermore, a vehicle having the device is specified according to the invention. The vehicle is preferably an ego vehicle of a driver.

Furthermore, a computer program comprising commands that, when the computer program is executed by a computer, cause the latter to carry out steps of the method is specified according to the invention. A computer program is a collection of instructions for carrying out a specific task that is designed to solve a specific class of problems. The instructions of a program are designed to be executed by a computer, it being necessary for a computer to be capable of executing programs in order for it to function.

Furthermore, a data carrier signal that transmits the computer program is specified according to the invention.

Furthermore, a computer-readable medium comprising commands that, when executed by a computer, cause the latter to perform steps of the method is specified according to the invention.

The basic concept of the present invention is therefore that ultrasonic sensors that are able to transmit ultrasonic signals on at least two different frequencies are used. This ability of the ultrasonic sensor to be able to transmit and receive at two different frequencies is now used to improve robustness toward low-frequency magnetic fields.

First of all, it is necessary to detect that there is interference in the range of the ultrasonic sensor frequency. If this is the case, the ultrasonic sensor is switched to the other frequency. Surprisingly, it has been found that, for compatibility with the magnetic fields, the two frequencies (channels) were never subject to interference at the same time. This makes it possible to prevent failure of the ultrasonic sensor by switching the frequencies (transmission channels).

In the context of the invention, frequency/frequency range and frequency channel/channel are used with the same meaning.

The invention has the advantage that an ultrasonic measurement may be carried out particularly inexpensively and in particular without further protective measures in an interfering environment in which magnetic fields or electric fields prevail, for example, without the measurements being affected by these. The magnetic fields may be very strong, e.g. may have a strength of up to 10 A/m. Even with such strong magnetic fields, it was surprisingly found that the invention always provides a detectable measuring range on at least one (frequency) channel, and measurements by means of ultrasound in the kilohertz range are always possible. Compact installation of multiple sensors, such as for example a keyless sensor and a parking sensor based on ultrasound, while maintaining the functionality of both sensors, is thus advantageously possible. The solution is implementable in a particularly inexpensive, robust and compact manner. Also, little weight is produced on installation in the car bodywork.

According to an advantageous embodiment of the invention, there is provision for the method to comprise a method step of emitting, by means of the ultrasonic sensor system, ultrasound having a first frequency range and ultrasound having a second frequency range. This advantageously directly creates a starting point for checking which of the two frequency ranges is less affected by external influences.

According to an advantageous embodiment of the invention, there is provision for the method to comprise method steps of determining, by means of the control system, whether there is interference in the first frequency range or in the second frequency range on the basis of the detected noise in the signal; and if the interference is determined in either the first frequency range or the second frequency range, emitting, by means of the ultrasonic sensor system, ultrasound in either the first or the second frequency range for which no interference is determined. It is thus advantageously possible to check which of the two frequency ranges is affected less or not at all by external influences. In particular, if there is interference on both channels, that frequency range which is not affected by interference is then selected.

According to an advantageous embodiment of the invention, there is provision for the method to comprise method steps of, if no interference is determined in the first frequency range or in the second frequency range, emitting, by means of the ultrasonic sensor system, ultrasound in either the first or the second frequency range or emitting, by means of the ultrasonic sensor system, ultrasound in the first and the second frequency range. Two-channel operation of the ultrasonic sensor system is particularly preferred. In this case, it is also possible to monitor both channels for whether interference occurs. If the ultrasonic sensor system is switched to a channel, the other channel is preferably checked at regular intervals to determine whether it is no longer subject to interference.

According to an advantageous embodiment of the invention, there is provision for the determination, by means of the control system, of whether there is the interference in the at least one frequency range to comprise noise quantification in an integrated circuit, IC, of the ultrasonic sensor system. By way of example, such noise quantification may be effected using a continuous-wave noise bit, CWN bit, and a wideband noise bit. This advantageously allows a simple check to determine whether there is interference.

According to an advantageous embodiment of the invention, there is provision for the determination, by means of the control system, of whether there is the interference in the at least one frequency range to comprise detection of a reduction in a receiver gain of the ultrasonic sensor system. Such a reduction is also referred to as clamping.

According to an advantageous embodiment of the invention, there is provision for the determination, by means of the control system, of whether there is the interference in the at least one frequency range to be performed on the basis of recognition of a noise pattern. In particular, it is then possible for example to use previously trained patterns to detect whether there is interference. This consequently also improves simpler detection of interference.

The invention is explained in more detail below with reference to the attached drawing and on the basis of preferred embodiments. The features shown may each represent an aspect of the invention both individually and in combination. Features of different exemplary embodiments may be transferred from one exemplary embodiment to another.

According to a method step numbered "100", ultrasound having at least one frequency range is emitted by means of an ultrasonic sensor system.

According to a method step numbered "200", an echo produced by the ultrasound is received by means of the ultrasonic sensor system.

According to a method step numbered "300", a signal corresponding to the echo is output to a control system by means of the ultrasonic sensor system.

According to a method step numbered "400", noise in the signal is detected by means of a detection system.

According to a method step numbered "500", the control system is used to determine whether there is interference in the at least one frequency range on the basis of the noise in the signal. This is immediately followed by a decision among multiple options.

One possible option is the step numbered "600". This is selected if there is interference (in accordance with option "Y"). According to the method step numbered "600", if the interference is determined, ultrasound having at least one frequency range for which no interference is determined is emitted by means of the ultrasonic sensor system.

One possible option is the step numbered "700". This is selected if no interference is determined (in accordance with option "N"). According to the method step numbered "700", if no interference is determined in the first frequency range or in the second frequency range, ultrasound in either the first or the second frequency range is emitted by means of the ultrasonic sensor system.

Alternatively, according to a method step numbered "800", if no interference is determined in the first frequency range or in the second frequency range, ultrasound in the first and the second frequency range is emitted by means of the ultrasonic sensor system.

Figure 1:
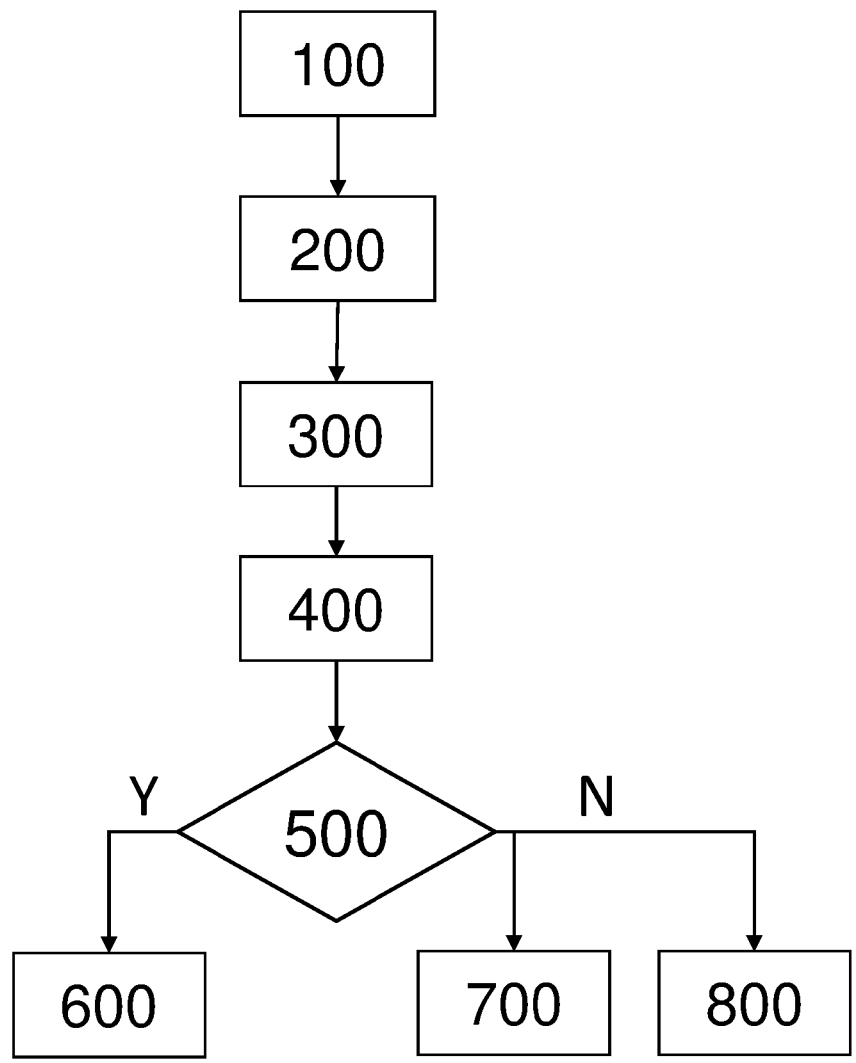
FIG. 1 shows a flowchart for an exemplary embodiment of the method.
Figure 2:
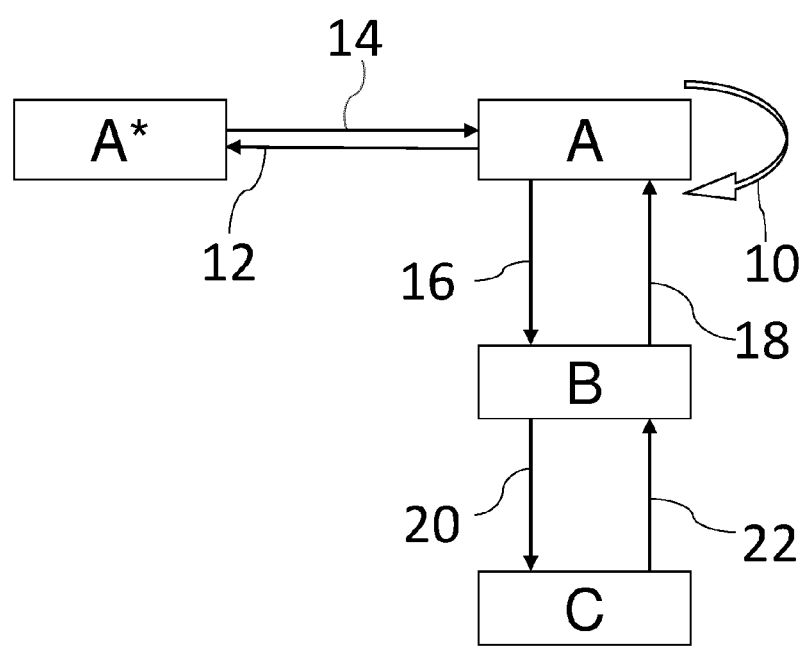
FIG. 2 shows a relationship diagram for possible modes in which the device according to the invention may operate depending on the disruption.

FIG. 2 shows a relationship diagram for possible modes in which the device according to the invention may operate depending on the disruption. Here, the device comprises an ultrasonic sensor system having a dual-chirp operating mode. This means that the system operates with two different frequency ranges in the ultrasonic range in accordance with two different channels.

The device is based on a single sensor that operates in two alternating channels having higher and lower excitation frequencies and ensures interference-free operation of the sensors using a single channel in the presence of narrowband continuous-wave (CW) magnetic noise—so-called "channel switching".

The trigger conditions for "channel switching" are defined in the device on the basis of at least one of the following criteria/measures:
  noise quantification in an integrated circuit, IC, of the ultrasonic sensor system using a continuous-wave noise bit (CWN bit) and a wideband noise bit,
  detection of a reduction in a receiver gain of the ultrasonic sensor system, or
  recognition of a noise pattern.

Depending on the strength of the interfering environment, for example the applied external magnetic noise, there are three different functional states:
  noise mode (see box with the letter A* or A in FIG. 2) with full functionality: both channels are OK (A*) or reduced power on one channel (A),
  DEGRADED NOISE mode (see box with the letter B in FIG. 2) with restricted functionality: one of the channels is completely inoperable, but the other channel has full functionality, or
  BLIND mode (see box with the letter C in FIG. 2) without operation: both channels are subject to interference.

The normal mode corresponds to the mode in which no interference, e.g. in the form of noise, is determined. In this case, the ultrasonic sensor system is operated normally. In FIG. 2, the normal mode is denoted by "A*".

It is possible to change over from the normal mode A* to mode A, in accordance with the arrow with the reference numeral "14". This can happen when wideband noise (WBN) or continuous-wave noise (CWN) is greater than ambient noise, i.e. signal noise produced by actual detection processes of the ultrasonic sensor system.

It is possible to change over from mode A to the normal mode A* if there is no wideband noise and the continuous-wave noise is significantly less than ambient noise. This corresponds to the arrow with the reference numeral "12".

It is possible to change over from mode A to mode B if only one of the two available frequency channels is free and the other channel is completely clamped (see explanations below). Such changeover is represented by the arrow with the reference numeral "16". It is also possible to change from mode B to mode A if both channels are determined as being available. This is represented by the arrow with the reference numeral "18".

It is possible to change over from mode B to mode C if neither of the two available frequency channels is free. Such changeover is represented by the arrow with the reference numeral "20". It is also possible to change from mode C to mode B if both channels are determined as being available. This is represented by the arrow with the reference numeral "22".

A bit for indicating wideband noise, referred to as the "WBN bit" for short, is set if the noise level is above a specific threshold outside of an operating frequency (out-of-band), which is dictated by the analog input specification of the integrated circuit (IC). This means that the analog input of the IC is in saturation and proper signal processing is not possible. In other words, the echoes may be lost and obstacles are not detected.

To avoid this, a noisy condition is reported by the sensor to the control unit and the system sensitivity (gain) is reduced during noise monitoring until the WBN bit disappears. This reduction in sensitivity, so-called "clamping", limits the dynamic gain and reduces the detection range. This is represented using reference numeral "10" in FIG. 2. If the maximum permissible clamping for a channel is exceeded, the system changes to the reduced-noise mode. Otherwise the system remains in the noise mode (according to A*) with cyclic clamping for every third measurement on the interference-affected channel of the sensor.

Continuous-wave noise (CWN) is measured during a noise monitoring window around the operating frequency (in-band noise) before the transmission phase (e.g. for 4 bits, values from 0 to 14 are used), these being used to quantify the narrowband CW noise overlaid on the signal after the correlation for each channel. The CWN is measured during the noise monitoring window prior to transmission and the measured values of each individual sensor are evaluated separately for the high and low channels.

Another criterion for noise detection is based on a statistical analysis of raw data in order to distinguish known object shapes in the signal from the noise. An increased noise signal may thus be detected in the envelope curve, said signal needing to be checked as an additional criterion before changing to mode A (arrow with the reference numeral "14" in FIG. 2).

LIST OF REFERENCE SIGNS

10 Clamping
12 Changeover from mode A to mode A*
14 Changeover from mode A* to mode A
16 Changeover from mode A to mode B
18 Changeover from mode B to mode A
20 Changeover from mode B to mode C
22 Changeover from mode C to mode B
100 Emitting, by means of an ultrasonic sensor system, ultrasound having at least one frequency range
200 Receiving, by means of the ultrasonic sensor system, an echo produced by the ultrasound
300 Outputting, by means of the ultrasonic sensor system, a signal corresponding to the echo to a control system
400 Detecting, by means of a detection system, noise in the signal
500 Determining, by means of the control system, whether there is interference in the at least one frequency range on the basis of the noise in the signal
600 If the interference is determined, emitting, by means of the ultrasonic sensor system, ultrasound having at least one frequency range for which no interference is determined
700 If no interference is determined in the first frequency range or in the second frequency range, emitting, by means of the ultrasonic sensor system, ultrasound in either the first or the second frequency range 800 If no interference is determined in the first frequency range or in the second frequency range, emitting, by means of the ultrasonic sensor system, ultrasound in the first and the second frequency range A Noise mode with full functionality despite interference A* Normal mode without interference and with full functionality B DEGRADED NOISE mode (=noise mode with one channel)

C BLIND mode (both channels subject to interference)

Y Option for interference

N Option for no determined interference

The invention claimed is:

1. A method for measurement by an ultrasonic sensor system in an interfering environment for a vehicle, the method comprising:
   emitting, by means of the ultrasonic sensor system, an ultrasound disposed within at least one frequency range;
   receiving, by means of the ultrasonic sensor system, an echo produced by the ultrasound;
   outputting, by means of the ultrasonic sensor system, a signal corresponding to the echo to a control system;
   detecting, by means of a detection system, noise in the signal;
   determining, by means of the control system, whether there is interference in the at least one frequency range on a basis of the noise in the signal; and
   when the interference is determined, emitting, by means of the ultrasonic sensor system, an ultrasound disposed within at least one frequency range for which no interference is determined,
   wherein the determination, by the control system, of whether there is the interference in the at least one frequency range comprises noise quantification in an integrated circuit of the ultrasonic sensor system, and
   wherein the noise quantification is effected using a continuous-wave noise bit or a wideband noise bit.

2. The method as claimed in claim 1, further comprising: emitting, by means of the ultrasonic sensor system, an ultrasound disposed within a first frequency range and an ultrasound disposed within a second frequency range.

3. The method as claimed in claim 2, further comprising:
   determining, by means of the control system, whether there is interference in the first frequency range or in the second frequency range on the basis of the detected noise in the signal; and
   when the interference is determined in either the first frequency range or the second frequency range, emitting, by means of the ultrasonic sensor system, the ultrasound disposed in either the first or the second frequency range for which no interference is determined.

4. The method as claimed in claim 3, further comprising:
   if no interference is determined in the first frequency range or in the second frequency range, emitting, by means of the ultrasonic sensor system, the ultrasound disposed in either the first or the second frequency range, or
   emitting, by means of the ultrasonic sensor system, the ultrasound disposed in the first and the second frequency range.

5. The method as claimed in claim 1, wherein the determination, by means of the control system, of whether there is the interference in the at least one frequency range comprises detection of a reduction in a receiver gain of the ultrasonic sensor system.

6. The method as claimed in claim 1, wherein the determination, by means of the control system, of whether there is the interference in the at least one frequency range is performed on the basis of recognition of a noise pattern.

7. The ultrasonic sensor system for a vehicle for measurement in the interfering environment, wherein the ultrasonic sensor system is designed to perform the method as claimed in claim 1.

8. A device for measurement by means of an ultrasonic sensor system in an interfering environment for a vehicle, the device comprising:
   the ultrasonic sensor system configured to emit an ultrasound disposed within at least one frequency range, to receive an echo produced by the ultrasound, and to output a signal corresponding to the echo to a control system;
   a detection system configured to detect noise in the signal; and
   the control system configured to determine whether there is interference in the at least one frequency range on a basis of the noise in the signal,
   wherein the ultrasonic sensor system is designed so as, if the interference is determined, to emit an ultrasound disposed within at least one frequency range for which no interference is determined;
   wherein the determination, by the control system, of whether there is the interference in the at least one frequency range comprises noise quantification in an integrated circuit of the ultrasonic sensor system, and
   wherein the noise quantification is effected using a continuous-wave noise bit or a wideband noise bit.

9. The vehicle having an ultrasonic sensor system as claimed in claim 7.

10. A computer program comprising commands that, when the computer program is executed by a computer, cause the computer to carry out the method as claimed in claim 1.

11. A computer-readable medium comprising commands that, when executed by a computer, cause the computer to carry out the method as claimed in claim 1.

* * * * *